United States Patent [19]
Fetsch

[11] 3,934,925
[45] Jan. 27, 1976

[54] SYSTEM FOR LOCKING DOORS OF BUSES
[76] Inventor: Joseph T. Fetsch, 26 Concord Road, Port Washington, N.Y. 11050
[22] Filed: Feb. 14, 1974
[21] Appl. No.: 442,508

[52] U.S. Cl. .................. 296/28 A; 49/345; 49/351; 180/112; 292/6; 292/202
[51] Int. Cl.² ......................................... B62D 31/02
[58] Field of Search ............ 296/28 A, 28 AB, 146; 180/111, 112; 292/6, 202; 49/351, 345, 302, 395; 105/368 R, 370, 371

[56] References Cited
UNITED STATES PATENTS

| | | | |
|---|---|---|---|
| 1,060,251 | 4/1913 | Hagstrom | 49/395 |
| 1,416,308 | 5/1922 | Silverman et al. | 49/395 |
| 1,477,992 | 12/1923 | Benedict et al. | 180/111 |
| 2,098,126 | 11/1937 | Zaitz | 49/345 |
| 2,198,796 | 4/1940 | Williams | 49/345 |
| 2,604,180 | 7/1952 | Onstott | 180/111 |
| 2,725,099 | 11/1955 | Frie et al. | 49/345 |

Primary Examiner—Robert J. Spar
Assistant Examiner—Donald W. Underwood

[57] ABSTRACT

To meet the legal requirements for bus safety, all locking devices on entrance and emergency doors must be removed before the bus is placed in service. For that purpose, the ignition key is made part of a simple locking assembly that is used to lock the emergency door. The driver's obtaining the key to operate the bus engine, insures the unlocking of the emergency door. The unlocking of the entrance door is accomplished by an inside pivoted cam assembly, actuated by a locking handle on the outside of the bus. The unlocking pivoted cam assembly inside the bus, then entirely disengages the door controlling mechanism, which then has normal operating freedom.

10 Claims, 3 Drawing Figures

SYSTEM FOR LOCKING DOORS OF BUSES

This invention relates to locking systems for bus doors when the driver leaves the bus temporarily, or when the bus is parked at night and there will be no one present.

The field of application of the invention includes those buses which have a front door or doors, subject to the operation and control of the driver to move to open position to admit passengers or to permit passengers to exit from the bus.

Such buses, within the field of application of this invention, are also provided with an emergency door, which is usually at the rear of the bus, and is normally in a closed position, but which must be capable of being opened from inside the bus or from outside the bus, as an emergency measure, at all times when the bus is in service.

The present invention is intended to provide a locking system for the entrance door or for both doors of such a bus, when the bus is left standing temporarily with no passengers in the bus, and the bus is to be locked against unauthorized or unlawful entry. Similarly, both doors of the bus are to be locked against unlawful entry when the bus is parked — that is, parked for storage, as, for example, overnight.

Present conventional procedure for locking buses utilizes what is essentially a simple hasp lock for locking each door, with a common key for locking and unlocking the two locks, or individual keys for each of the locks, or a combination of a lock and a system of a bolt connected to an electrical starter interlock.

The conventional system is simple enough merely as a locking system for the two doors, but the law requires that the rear or emergency door must always be unlocked during operation of the bus in service for passenger use.

The problem introduced by this conventional simple locking system with a lock at each door is that an uncertainty is introduced, because of the possible failure of the driver to make sure that the emergency door is not locked, through inadvertence and forgetfulness. It is imperative that the emergency door will always be available for operation in an emergency by a passenger in the bus, or by a person outside the bus, under such emergency conditions.

The disadvantage of the electrical interlock system, however, is that it leaves a bolt in place by the emergency door, which could be operated by a passenger and thereby lock that important exit. Furthermore, the added complication of the associated switches and relays introduces unnecessary service problems, along with the possibility that the system, if defective at any time, might be by-passed rather than repaired.

Because of that legal requirement, that the emergency door must be unlocked at all times when the bus is being operated in passenger service, the locking system must be made fail-safe and secure against the possible failure of the driver to remember to unlock the emergency safety door or the relocking of that door while the bus is in service, to insure that it will be available for opening operation in case of an emergency.

In accordance with the present invention, the driver is compelled to perform a certain sequence of operations that will insure the emergency door is unlocked and cannot be relocked by the driver when the bus is in passenger service. To insure that condition, of unlocked emergency door, the operation of actually unlocking the emergency door by the driver, is made a pre-condition to making the ignition key available to him for use in starting the engine of the bus.

In accordance with the invention, when the empty bus is to be left standing alone, without the presence of a guardian, the emergency door is locked by a small convenient mechanical locking assembly which contains or carries the ignition key. That locking assembly is utilized to lock the emergency door against tampering or unauthorized entry.

When bus operation is to be resumed, the driver, after entering the bus at the front door, is compelled to remove the locking assembly from the emergency door, in order to have the ignition key available for use at the ignition switch lock at the front of the bus. That operation of removing the locking assembly and the ignition key from the emergency door, releases the emergency door from its locked condition, and puts the door in an unlocked condition, as is required by law. Since the driver cannot start the bus without the ignition key, the compelled operation of removing the ignition key and its supporting locking assembly from the emergency door, provides the assurance that the emergency door has been unlocked and will be available for proper emergency use, as required by law. The ignition key, as part of the removed locking assembly, is then available to the driver for insertion in the ignition lock for starting and operating the bus.

The system of the invention also utilizes, in part, the regular door-opening and door-closing control equipment, with a simple key-controlled operation from outside the bus, to achieve and to permit convenient entry into the bus by the driver or other authorized persons.

An important feature of the invention is that the regular door-operating equipment functions independently in its normal way, without any inhibition or restraint from the system of the invention, even though the regular door-operating equipment enters into the new combination and method of this invention.

Thus, when the bus is to be locked and left standing or stored, the driver drives the bus to its location, stops the engine, and removes the ignition key, which is carried on the locking assembly of this invention. That locking assembly is then placed on the operating lever which serves as the handle of the emergency door, and is attached to and anchored on a stationary bracket fixed or fastened to the emergency door itself, so that the operating lever, as the handle of the emergency door, cannot be moved from its closed position to its opened position, so long as the assembly containing the ignition key is in locking position on the operating handle of the emergency door. Under those locked conditions, the emergency door cannot be opened from inside or from outside, so long as the locking assembly is in place. After thus locking the emergency door, the driver then leaves the bus, and from outside the bus, moves the front door or doors, if double, to closed position, which operation will move the bus driver's handle inside the bus, to closed position. The bus front door is now closed and ordinarily cannot be operated and opened without access to the driver's operating handle for the front door, which is located inside the bus.

In those buses, to which this invention is shown applied, and that occupy high-grade status in the industry, the driver's door-opening handle is turned about a pivotal axis through an arc, from one end of the arc to the other end of the arc, which movement of the handle is made sufficient to move the front door from open position to closed position, or vice versa. In order to prevent undesired opening of the door by jiggling of the door from outside the bus, which could enable the door to be opened by unauthorized persons, the movement of the driver's handle is arranged to move through an arcuate path that will move the connecting rod, between the handle and the door, to a position that is sufficiently over dead-center so that the jiggling of the rod by shaking of the front door from outside of the bus, will not be able to move the driver's handle, in its arcuate path, to the opposite side of the dead-center position, where the handle could then be moved by continued jiggling of the door and the connecting rod, to the open position.

In the present invention, the standard conventional door control mechanism, including a pivoted driver's handle, and its crank connection to a connecting rod to the door or doors, is all retained and utilized as part of the new combination of this invention, by means of which access is obtained to the driver's inside door handle from outside the bus. A pivoted pressure force cam, as part of the present invention, is disposed and supported adjacent to the driver's door-operating handle, and that cam is operable through mechanical connections to a rod extending out through the cowl of the bus to a key-controlled handle on the outside face of the cowl. Said outside handle, on the outside of the cowl of the bus, is mounted to have, and to be permitted, only a short angular movement, which is sufficient to operate the inside pressure force cam at the driver's door-operating handle through a proportional or corresponding angle, sufficient to move the driver's handle sufficiently past its dead-center position, to the other side of the dead-center line, so that the front door may then be easily manipulated from outside of the bus, to further move the driver's operating handle, and to move the front door or doors from closed position to open position, all at the same time that the driver's door-operating handle is moving to open door position.

Once the cowl mounted handle has been actuated from outside the bus, this outside handle is normally returned to its disengaged position by the action of a spring or similar device and then relocked by the driver. Should the restoring force of the spring be insufficient to overcome the resistance of the handle to return to its disengaged position, and therefore remains either wholly or partially in its actuated position, the action of the driver in closing the door-operating handle will force the now passive, pressure force cam back through its own normal arc of action to its disengaged zero or inactive position. Simultaneously, this will return the cowl mounted handle to its zero or inactive disengaged position.

Once the front door is open, the driver may enter the bus and then operate the driver's handle to close the door, without any interference from the pressure force cam which moved the handle toward opening position, since the pressure force cam has no direct mechanical connection to the driver's handle, and serves its purpose only by applying an external side pressure force on the handle.

Before starting the bus, however, the driver must have the ignition key, and, to obtain it, he must now go to the rear of the bus and remove the locking assembly from the operating handle of the emergency door. That removed locking assembly then makes available, to the driver, the ignition key which he can then use to start the engine of the bus and operate the bus.

As stated, the driver's handle for the front door is now free to operate in exactly its normal manner to open the door and to close the door, without any interference from the pressure force cam, which will be back in its normal disengaged position, away from the driver's door handle. In the operation of moving the pressure force cam from outside the bus, the outside lever handle, normally locked, is first unlocked, so it may be moved from its disengaged position to actuating position, and is mechanically connected to move the pressure force cam inside the bus. After that operation of releasing the driver's handle to normal operating position, the cowl mounted outside handle is restored to its disengaged position, and relocked with any simple locking mechanism, either a tumbler lock on the handle or by a hasp lock, to a fixed bracket. The operation of moving the outside lever handle back to its disengaged, normal rest position for locking, will serve, at the same time, to move the inside pressure force cam back to its disengaged position, away from the closing position of the driver's door handle, which will have already been moved to its over-center released position, free to move with the front door when that door is subjected to a manual opening operation from outside the bus.

When a tumbler lock is used to lock the cowl mounted handle, the lock is so constructed as to prevent the key from being withdrawn, unless the handle is returned to the disengaged position. This arrangement is designed to discourage a driver from leaving the cowl mounted handle engaged or unlocked. When a hasp lock is to be used, the shape of the handle and the associated fixed bracket are such that the hasp lock can not be re-attached unless the handle has returned to its disengaged position. This arrangement is designed to insure that the handle has been returned to its disengaged position and that the hasp lock will not be lost, but rather locked onto the handle. In this condition, the driver, when he locks the bus, will not have to remember to do anything other than to close the front door in order to prevent the front door from being used by unauthorized persons to gain entrance to the bus.

The philosophy of the system of this invention is such that it requires the driver, after first opening the front door for entrance to the bus, to then obtain the ignition key by unlocking the emergency door, so that this door is in proper legal condtion for operating the bus, and the driver now has the ignition key to start the engine and operate the bus. At this time, the driver's regular door-operating handle is completely free of any mechanical restraints or barriers, and the bus operation is completely normal, and legally safe.

Also, an important benefit of this invention, is the fact that, after parking the bus at the termination of its service, the driver must, in order to lock the bus, traverse the length of the bus twice, and he is therefore forced to ascertain the condition of the interior of the bus as well as discover any lost articles therein. Though this is usually a required procedure, drivers tired from a long day of driving, tend to neglect this duty.

The locking assembly containing the ignition key, has as part of it, a snap or fastener which, when not serving to secure the emergency door handle in its latched position, is used to attach the ring for carrying the key for the cowl mounted handle tumbler lock or hasp lock, thereby preventing its loss or misplacement. Normally, this key ring has attached to it a means of identifying it with a particular bus. This is usually done by a numbered tab and is done to facilitate the correct matching of key to bus. The ring is also used to retain the auxiliary keys, for the outside luggage compartment, for the fuel cap, for the tool box, and for the tackograph and bar. These keys may be detached for use by the driver while leaving the engine operating, to maintain a continuous operation of the heating or air conditioning systems. Where the fuel is gasoline, the fuel cap key is attached to the ignition key, to prevent fueling the bus with the engine running.

Furthermore, by designing the locking mechanism of the cowl mounted handle so that it must be locked just after use, we substantially increase the likelihood that the bus will actually be locked. Should the driver fail to remember to lock the emergency door, the keys that he will turn into the dispatcher will contain the locking assembly and this situation can easily be detected by the dispatcher. The natural tendency of a person to close a door behind him coupled with the fact that an open door can be seen from some distance outside of the bus, tends to insure that the entrance door will indeed be closed. Our experience with this bus locking system has been that the driver will consistently lock his bus.

The importance of this bus locking system lies in its utter simplicity, in the way each step or procedure in its operation invites compliance and by the absolute assurance that this system will not interfere with or effect the safe operation of the doors of a bus while in service.

The construction details of the components of the system, and the various steps that are imposed upon the bus driver, to compel him to do everything that is necessary to place the bus in proper legal and safe operating condition, with respect to the emergency door, are described in the following specification, in connection with the drawings, in which.

Basically, the purpose of the invention is to provide a system for locking both the front operating doors of the bus and the emergency door of the bus, when the bus is parked, and not in service operating with passengers, or when the bus is stored and locked against intrusion, with assurance that the emergency door will be unlocked when the bus is again put into passenger service.

Before the bus can be put into service again, however, both the front doors and the emergency door must be perfectly free to be operated normally and regularly from the inside of the bus, and the emergency door must also be assuredly free for operation from the outside of the bus. The assurance of free operation of the front door is provided in the fact that the driver must open the front door in order to enter the bus. That is not sufficient however, to assure that the rear emergency door is also unlocked, or that the bus driver will remember, or has remembered, to unlock the emergency door, which is otherwise normally latched, but not locked closed.

It is a primary and basic purpose of the present invention, to asssure, absolutely, in the operation of the bus in passenger service, that the emergency door has been, and is, unlocked, and must be, and is, free to be opened both from the inside and from the outside of the bus, to serve its intended availability as an exit in the case of emergency.

In order to provide that assurance, this invention provides that the locking means for the emergency door be made to serve as a carrier for the ignition key. Thus, the locking means for the emergency door remains at the emergency door so long as that door stays closed; and the ignition key stays with the locking means, which serves as a carrier for the ignition key. To start the engine, the ignition key must be used. Therefore, the release of the carrier and the ignition key from the emergency door, to make the ignition key available, will serve to unlock the emergency door, which was locked for proper purposes while the bus was not being used in passenger service. Although now unlocked, that emergency door remains merely latched closed, but susceptible to necessary emergency opening as required by law.

In the drawings, the apparatus of this invention is shown applied to the door control equipment of a typical conventional bus.

Figures 1, 1A:
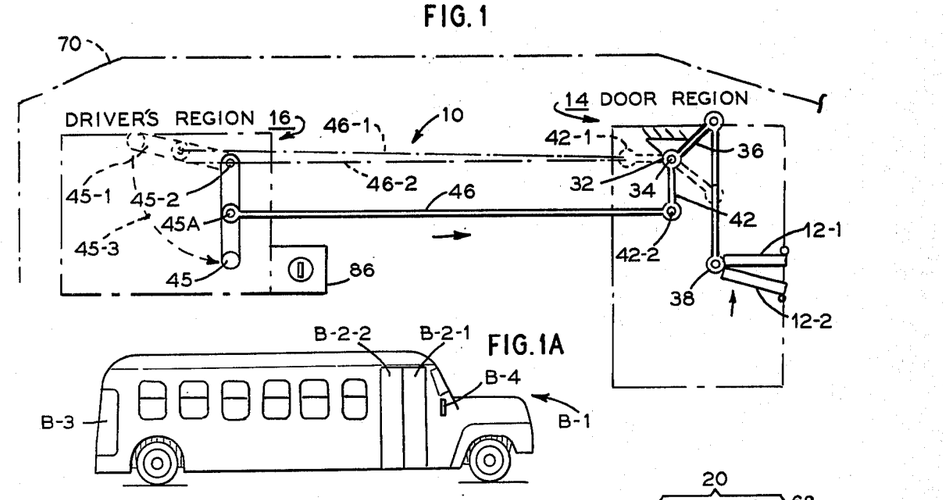
FIG. 1A is a simple schematic side view of a passenger bus.
FIG. 1 is a simple schematic force diagram of the elements of a typical bus door-operating system, to which the present invention is applied.

FIG. 1A shows schematically a conventional bus B-1, with two front doors, B-2-1 and B-2-2, generally operable together by the driver of the bus, to permit entry or exit of passengers. The bus has an emergency door B-3, here shown at the rear, that is normally held latched closed, but not locked, when in passenger service. An external control lever B-4, on the cowl, permits the opening of the bus from outside when locked.

By law, the emergency door, wherever located, must not be locked, but only latched closed, when the bus is in passenger carrying service, so the emergency door can be opened from inside or from outside, at any time, for possible emergency.

Nevertheless, all doors of the bus must be locked to prevent intrusion and vandalism or theft, when the bus is stored or when it is parked during non-use. This invention is directed to a system for locking the bus doors, but for positively assuring that the emergency door will be unlocked, even though latched closed, when the bus is subsequently placed in passenger carrying service.

As shown in FIG. 1, the door control apparatus 10 for a typical front door operation of a conventional bus, is shown as comprising the two panel doors 12-1 and 12-2, jointly operable, in door region 14, shown in broken line rectangle. This region 14 represents the door region where the front passenger door and its control mechanism are located. The driver region 16 contains the main operating driver's handle by means of which the driver opens and closes the doors for normal operation to permit passengers to enter or to leave.

This simple and unimpeded normal operation of the front doors must always be available during the operation of the bus. Consequently, a feature of the safety control operation imposed by the present invention is the design and application in such a way that there is no interference with any of the normal door operations, or with the door-operating equipment.

Figure 2:
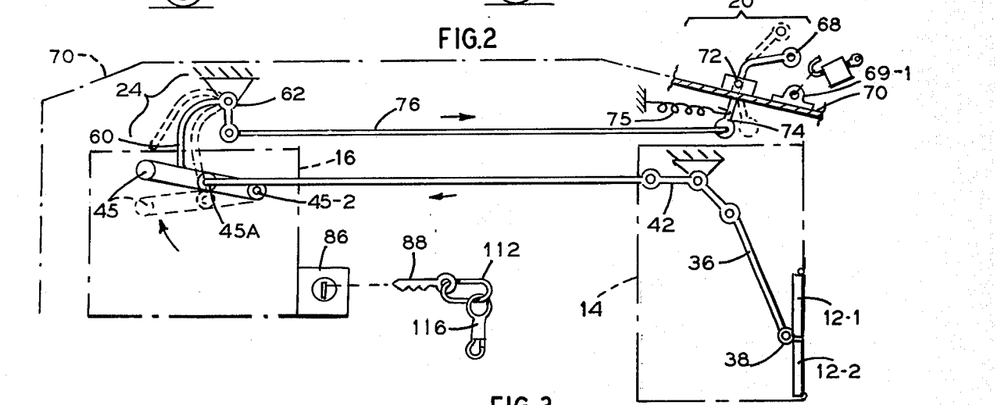
FIG. 2 is a simple schematic force diagram illustrating the control elements of the invention disposed in cooperative relation to said door-operating system, whereby a door-unlocking force is applied from outside the bus to the conventional driver's door handle, when that handle is in door-closing position and the door is closed, so the force from outside the bus may be applied toward opening the bus doors by means of such remote control of the regular driver's door handle.

The physical separation of the control equipment of this invention from the door-operating equipment is illustrated and emphasized in the showing in FIG. 2, where certain elements of the invention, included in the outlined space of line bracket 20, are shown disposed adjacent the door region for one operating feature of the invention, and other parts are included in outlined space of bracket 24, adjacent the driver region, for a co-operating functional feature of the invention.

These operations of the normal door operation, and as controlled by the invention, may now be considered.

As shown in FIG. 1, the door region 14 contains a pair of front doors, schematically illustrated 12-1 and 12-2, located at the front of the bus, to provide a closable opening for passengers to enter or to leave the bus.

The operating mechanism for the doors is indicated schematically, and is shown as including a rotatable post element 32 which may be a vertical tube supported for rotation about a central vertical axis 34, to operate a crank arm 36, illustrated as pivotally connected to the doors 12-1 and 12-2, at a pivot 38, to move the doors from closed position, to open position, or vice versa. This showing of door action around pivot 38 is purely schematic, for illustration only.

The movement of the front doors, to either position, is controlled by the rotatable element 32 acting on the lateral crank arm 36 that is pivotally connected to the doors at one or more hinge points 28. Here, the crank arm 36 is indicated to be movable through an angle which in the present case is shown to be about 90°, which is not here critical, but merely a function of the equipment design, not part of this invention.

To rotate the door-control post 32, a crank arm 42 is secured to the door-control post 32, and the crank arm 42 is operated by the driver's control handle 45 through a connecting rod 46.

At the driver's region, indicated by the broken line 16 in FIG. 1, the driver's control handle 45 is shown in door-open position. To close the front doors, the driver moves the handle 45 clockwise to the dotted position 45-1, which moves the connecting rod 46 which is pivoted to handle 45 at 45A to position shown in dot and dash line 46-1, and the crank arm 42 on the door-turning post 32 is moved to the position indicated at 42-1.

An important point to note here is that, in the closed position of the front doors, the force line at 46-1, between the handle pin at 45, at the driver's region 16, and the pivot point 42-2 on the crank arm 42-1, passes beyond and above the center line 46-2 between handle pivot axis 45-2 and crank axis 34. Therefore, with driver's handle 45 in this position 45-1 over dead-center of line 46-1, any jiggling or manipulation of the front doors will have little or no effect towards shifting the driver's handle 45 out of the over-dead-center position shown in FIG. 1.

This invention utilizes that feature of the driver's handle 45 being over-dead-center position when the front doors are closed.

Thus, according to this invention, when the bus is to be locked, it is parked where so desired, and the ignition key removed, and the key with its carrier, is applied to lock the emergency door, where the ignition key and locking carrier are left in locked position. The driver then leaves the bus, and closes the front doors from outside the bus, and those doors, acting through the mechanical linkage to the driver's handle 45, will move the driver's handle to the over-dead-center position 45-1 on force line 46-1, due to the inertia of the linkage system.

The bus is thus locked at both doors, and the front doors can now be opened only by pushing the driver's handle 45 sufficiently back from its over-dead-center position 45-1, by the external lever system of this invention, as shown in FIG. 2, and provided for that purpose as a feature of this invention, to permit the doors to be jiggled to open position.

For that purpose of authorized opening of the doors, the feature of the present invention is to provide a pressure element in driver's region 16, adjacent the driver's handle, to impress a lateral pressure force on the driver's handle 45, while it is in over-dead-center position, so such impressed lateral force will move the driver's handle out of its over-dead-center position, sufficiently into its free door-opening zone, to enable the doors to be then operated to force the lateral arms 36 and 42, to operate on the connecting rod 46 to move the driver's handle 45 freely further toward full-open position indicated in solid line in FIG. 1. In that full-open position of the handle 45, the front doors are then fully opened, so that the driver has clear access to enter the bus.

The apparatus of the present invention, for impressing a transverse or lateral push, for turning the driver's handle 45, is schematically shown in FIG. 2, as comprising a pivoted pushing force-producing element 60, shown pivotally supported to rotate about an axis 62, to push transversely on the side of the pivoted handle 45, to rotate that driver's handle 45 about its own supporting axis 45-2, to the door-opening position of FIG. 1.

The pressure-force push element 60 is arranged to be turned from outside the bus, by a rotatable lever 68 supported on a bracket 69 anchored on the outside of the cowl 70 of the bus. The lever 68 carries and turns a rotatable pin 72, that extends through and is supported by the bracket 69 and the cowl 70. Pin 72 operates to turn an internal crank arm 74, to pull on a connecting rod or flexible wire 76 connected to the pressure element 60, by means of which the pressure is generated to be applied laterally to push the driver's handle 45. The driver's handle 45 is thus moved part dead-center, to a position in its operating or turning region, shown as arcuate path 45-3, in FIG. 1. Once the driver's handle 45 is in its operating region 45-3, the front doors can be pushed backward freely, from their closed position in FIG. 2, toward open position, to rotate the door post 32, through the crank arm 36, which in turn then operates the other crank arm 42, and, through the connecting rod 46, pulls the driver's handle to full open position, as in FIG. 1, at which the front doors will also then be in full-open position to permit the driver to enter the bus.

An important feature of this invention, as just described, is the combination including the pushing element 60 to press the driver's handle 45 out of over-dead-center position of FIG. 2, in response to manual operation of the external handle lever 68 on the cowl of the bus. The importance of this feature is that, once the pushing pressure force has been impressed upon the driver's handle 45, to move the driver's handle into the operating zone 45-3 in FIG. 1, the work of the pushing pressure element 60 is done, and it is restored to its zero position by a spring 75 acting on crank-arm 74 and connecting rod 76, and at that position, pressure element 60 does not touch the driver's handle 45. Thus, the driver's handle 45 will have full normal regular freedom of operation, without any interference or restriction from the pushing pressure element 60 of this invention.

The pushing pressure element 60 is restored to its inactive zero position by the force of spring 75, thereby restoring the outside handle lever 68 to its initial zero position, at which the lever 68 is locked to a stationary boss 69-1 on a bracket 69 anchored to the cowl 70. Both the boss 69-1 and the lever 68 have an eye 68-1 through which a simple hasp lock 68-A may be attached to lock lever 68 against unauthorized movement.

In FIG. 2, the pushing pressure element 60, to push the driver's handle out of over-dead-center position, is merely schematically indicated.

Figure 4:
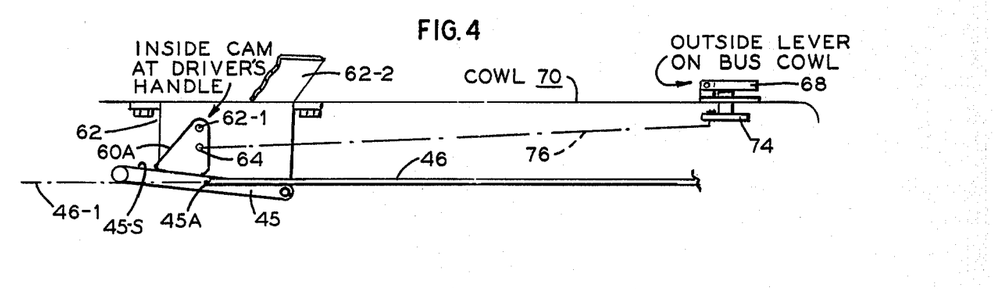
FIG. 4 is a schematic view showing the pressure force cam of the invention in disengaged position, ready to be moved to produce a side force to be applied to the door handle, which is shown in over-dead-center position and thereby serves to hold the bus front doors closed, such operation of the cam being effected by an external lever on the cowl.
Figure 5:
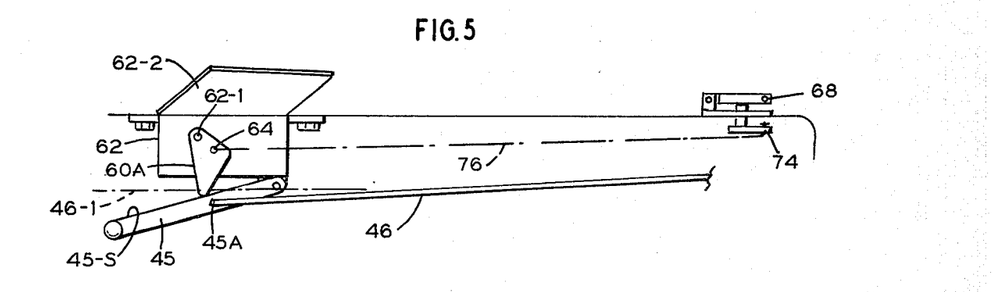
FIG. 5 is a view similar to FIG. 4, and shows the pressure force cam and the operating rod for the front doors, after the pressure force cam has been moved by the outside lever on the cowl to push the driver's handle toward door-opening position.

In actual application to a bus of current manufacture, the pushing pressure element is formed as a pivoted flat cam 60-A, as shown in FIGS. 4 and 5. The driver's handle 45 is pivotally supported on a box-like casting 62, that is structurally supported on the bus, and has a horizontal flat table top on which the push cam 60-A is flatly seated and pivoted on a pin 62-1, anchored on the casting. A pull pin 64 on the push cam 60-A is connected to the pull rod 76 that is controlled by the outside lever 68, previously shown in FIG. 2. To protect the cam 60-A from interference from a foreign body, a hinged cover 62-2 on the casting 62, is arranged to cover the top of the push cam 60-A, while leaving the push cam free to turn.

This cover, 62-2, otherwise not part of this invention, conventionally also serves to actuate a light switch which turns on the entrance step lights and the "Wig wag" lights, found on the roof of a School Bus. Actuation of the cover is accomplished by the driver's handle through a cam and roller arrangement; the cam being a part of the casting of the driver's handle 45 and the roller a part of the cover 62-2. The light switch is actuated to the off position by the pressure of the cover 62-2 down upon the switch plunger. The cover is forced down by the roller attached thereto, and the cam which comes into contact with it when the door handle is rotated into its over-dead-center position. When the driver's door handle is rotated from its over-dead-center position to its operating zone, the handle cam is moved free of the roller which is then free to move upward a short distance, under the force of the plunger pressing upward against the cover. The plunger obtains its force from a spring contained within the switch. When the driver's handle moves to door-opening position, the permitted upward movement of the cover 62-2 permits the light switch to close and complete the light circuits.

In FIG. 4, the push cam 60-A is shown in its neutral or rest position, closely spaced from, and normally not engaging, the side surface 45-S of the driver's handle 45, which is shown in over-dead-center position. In FIG. 5, the cam 60-A is shown in operated position, at which the driver's handle 45 has been moved forward from dead-center position defined by center line 46-2, so the handle 45 can move freely, and the front doors can now be manipulated to move the driver's handle 45 to full-open position, as in FIG. 1, which permits the front doors to be moved to full-open position, at the same time, to admit the driver. The push cam 60-A is shown in more detail in FIG. 8.

Another feature of the invention involves the ignition key of the bus and its carrier. The ignition key lock 86 is shown in FIG. 1 and also in FIG. 2, adjacent the driver's region 16. The ignition key 88 is indicated, and it will enter into the combination of elements that are utilized in this invention to achieve the control of the doors of the bus, to permit locking and unlocking, especially the emergency door, in accordance with prescribed law and safety requirements, for assuring that the emergency door is always unlocked, though latched closed.

Figure 3:
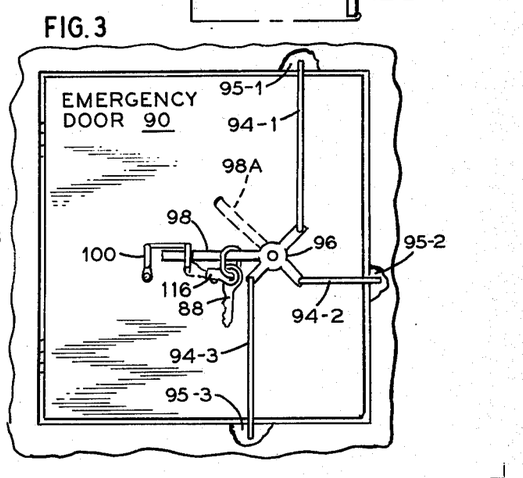
FIG. 3 is a schematic elevantional view of a typical emergency door, with a bar type handle shown for operating a three-point door latch arrangement, for latching the door and holding it latched in closed position, but not locked.

In FIG. 3, a typical rear door 90, to serve as an emergency door, is shown with a representative arrangement for latching the door closed in place, without actually locking it. A typical latching arrangement includes three latch bolts 94-1, 94-2, and 94-3. They are all simultaneously operable by a three-way cam 96 that is rotatable by a handle bar 98, from an open position, as shown in broken line 98-A, in FIG. 3, to a lowered or latching position, shown in solid line, in a saddle bracket 100 anchored on the door 90. In latching position, the handle bar 98 rests in the limiting saddle bracket 100. In the raised position of the handle bar 98, the cam 96 pulls the three latches 94-1, 94-2, and 94-3 out of their associated corresponding recesses 95-1, 95-2, and 95-3, which permits opening and removal of door 90.

Figures 3A, 3B:
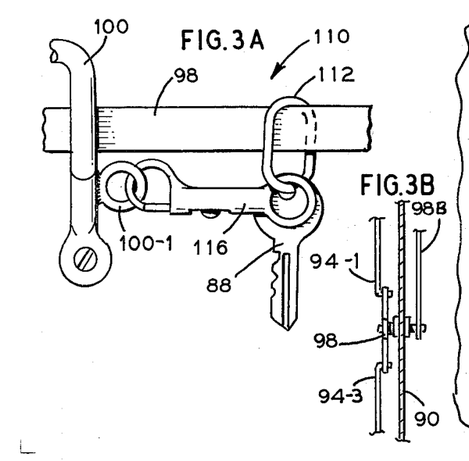
FIG. 3A is a schematic elevational view of the bar handle of FIG. 3, with a key ring applied to lock the emergency door of FIG. 3, and is shown serving also as a supporting ring for the ignition key to be used for the engine of the bus.
FIG. 3B is a side view of FIG. 3.

Normally, the door 90 is in place and is held latched closed by the three latches, with the handle bar 98 in its downward rest position in the saddle bracket 100. Handle bar 98 is otherwise free to be moved upward to the upper opening position, at which the latches will be removed from their recesses. Under such conditions, the door 90 may then be readily opened. In similar manner, when the handle bar 98 is in its lowered rest position, the cam 96 may also be operated from the outside of the bus by an external handle 98-B, as shown in FIG. 3B.

The need for a solution to the problem arising from the legal requirements with respect to the emergency door 90, was one of the primary motivations for the present invention. Under the usual legal requirements, the emergency door is to be merely latched closed in place, but is never to be locked, while the bus is being operated in passenger service. While so operating in passenger service, the emergency door must always be in such unlocked condition that the door may be opened, upon release from the latching, accomplished either from inside or from outside the bus, in order to take care of any emergency situation that might arise that could necessitate an exit passage from the bus.

Because of that legal requirement, the emergency door must never be locked while the bus is in operation for passenger service; but it may be locked only while the bus is parked or stored, while not operating in passenger service. However, a proper legal door-locking system must provide absolute assurance that the emergency door will always be unlocked when the bus is placed back in operation in passenger service. Thus, the primary purpose of the present invention is to provide such a door-locking and control system that will assure the unlocked condition of the emergency door during passenger service.

To provide that assurance that the bus emergency door is not locked, while the bus is in service and operating to accommodate passengers, a basic feature of this invention is to mount the ignition key of the bus on the locking assembly that is utilized to lock the handle bar of the emergency door against unauthorized intrusion.

Therefore, the overall locking system of this invention provides that when the emergency door is locked, while the bus is not in active service, the ignition key of the bus shall be held unavailable for operating the bus, by being supported on and included in the locking assembly that is utilized at the emergency door of the bus. Then, the main doors of the bus may be locked by manually moving the main doors to closed position with snap action, to the inertia of the door operating mechanism will push the driver's handle past dead-center position as in FIG. 2, so that those main doors will be locked, whereupon the bus as a whole is locked against intrusion.

Subsequently, when the bus is to be placed in passenger service again, and it is necessary for the driver to enter the bus, the entry is made at the front door by operating the external lever 68 on the cowl, for moving the driver's handle 45 to release position, whereupon the front doors of the bus can be opened to admit the bus driver.

However, before the bus driver can start the engine of the bus, he must have the ignition key; and he must therefore go to the emergency door to obtain the ignition key. Since the key is mounted on the locking assembly that is holding the emergency door locked, the driver must remove that locking assembly and removal of that locking assembly, with the ignition key, releases the rear door from locked condition. Thus, the removal of the key for the ignition system, positively assures the unlocking of the emergency door, so that door is in proper legal non-locked condition, and is merely latched in place, and can be removed, upon the occurrence of an emergency, by opening the latches, either by operation of the inside handle bar 98, or by operation of the outside handle 98-B.

In FIG. 3A, the locking assembly 110 is schematically indicated as comprising a ring 112 connected to a snap clip 116, both together serving as a support or carrier for the ignition key 88, as shown in FIG. 2.

The ring 112 is of appropriate size to fit easily and simply over the handle bar 98, for the emergency door 90, and the snap clip 116 is of appropriate size to enter and snap through an eye or loop 100-1, preferably integral and cast on the fixed bracket 100, suitably anchored on the door 90.

When the ring 112 is slipped over the handle bar 98, and the snap clip is snapped over the anchoring loop 100-1 on bracket 100, the latching cam 96 is effectively locked against operation by the inner handle bar 98 or by the outside handle 98-B. The locked condition of the emergency door is thus assured, so long as the locking assembly 100 is in place.

Subsequently, when the bus engine is to be started to operate the bus, the ignition key 88 is necessary, and it can be removed only by removing locking assembly 110 and releasing the handle bar 98, thereby assuring that when the ignition key 88 is taken to start the engine and to operate the bus, the emergency door 90 will be unlocked, even though the handle bar 98 remains in its downward latching position. The point is, that from then on, so long as the locking assembly is removed, the inside handle bar 98 may be operated by anyone in the bus in case of an emergency, and the outside handle bar 98-B can also be operated from outside the bus, if necessary, in the case of such an emergency.

Figures 6, 7, 8:
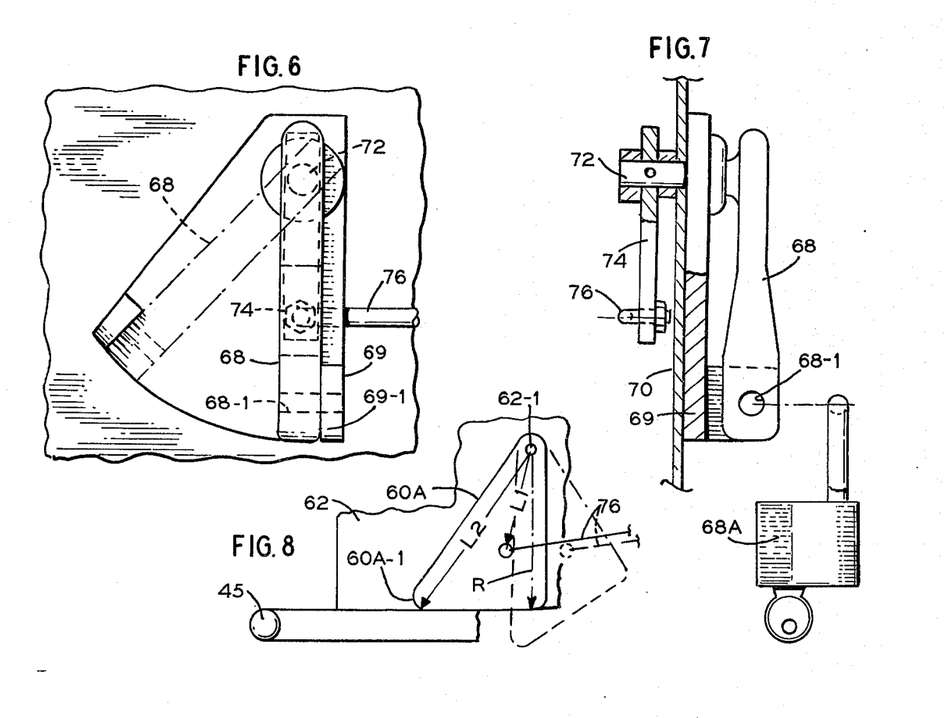
FIG. 6 is a front elevational view of the outside lever on the cowl for operating the pressure force cam inside the bus, to move the driver's handle to released position.
FIG. 7 is a side view, partially in elevation, and partially in section, of the outside cowl lever of FIG. 6 and its mounting on the cowl.
FIG. 8 is a plan view of the pressure force cam shown in normal inactive or rest position, and in operative, activated position, to show the radius arm relations between the pulling force on the cam, and the pressure force on the driver's handle.

FIG. 8 shows the pushing pressure force cam 60-A for shifting the driver's handle 45 past its dead-center position. The pressure cam 60-A is a flat plate supported on the top horizontal surface of the casting 62, on which the driver's handle is pivotally supported. The cam 60-A is of relatively triangular shape. The cam 60-A is pivoted on a pivot pin 62-1 at its upper corner, and has a pull pin 64 that is pulled by the pull rod 76 to turn the cam 60-A to engage the driver's handle 45, when the handle is past dead-center door-closed position as in FIGS. 2 and 4, and to move the driver's handle 45 out of dead-center position, as in FIG. 5.

The distance between pull pin 64 and pivot pin 62-1 represents the lever arm -L-1- to turn cam 60-A about its pivot pin 62-1. The distance from pivot pin 62-1 to the region of the cam toe 60-A-1, where the cam 60-A engages the driver's handle 45, represents the lever arm -L-2-, to push against the driver's handle 45. The angle of turn imparted to the cam 60-A, corresponds to the angle arranged by design in the movement of the external handle lever 68 on the cowl. The pull pin 64 is preferably disposed at the starting end of its arc of movement around pivot pin 62-1 so the arc will be bisected by the radius line —R— from the pivot pin 62-1 perpendicular to the side wall 45-S of the driver's handle 45 in door-closed position.

Thus, by the provision and arrangement of elements shown, and by the procedure outlined, the doors of a bus may be locked when the bus is not in service; and the non-locked condition of an emergency door is positively assured by introducing the ignition key into the locking assembly for the emergency door and requiring its removal to unlock the emergency door, to obtain the ignition key for the engine. Additionally, the ability of the driver's handle to move to door-locking position, upon manual closure of the main door or doors, is utilized as part of the system herein for holding the main door or doors closed, when the driver's handle is moved out of its over-center locking position by the external handle on the cowl, or other equivalent external location.

Modifications may be made to adapt the invention to various types of front door actuating mechanism, utilizing a self-locking driver's handle as herein, without departing from the spirit and scope of the invention as defined in the claims.

What is claimed is:

1. A protective and safety door-locking and unlocking system for a bus that has a front door for normal use and operation for passenger entrance and exiting and that has a rear emergency door that is normally to be kept latched closed but not locked, during passenger use of the bus, so said emergency door may be opened from inside or from outside the bus in case of an emergency; said locking and unlocking system comprising:
   a. means operable by the driver for normally operating the front door to an open position or to a closed position, for passenger entrance and exiting; said driver-operable means being also operable by said front door to be moved to a door-locking position to hold said front door closed against unauthorized entry, during non-passenger use of the bus;
   b. means independent of the normal driver-operable means for moving said driver-operable means from outside said bus, such that said driver-operable means is moved away from said door-locking position, to unlock said front door to provide access to the inside of the bus;
   c. an ignition system switch lock;
   d. an ignition key for said ignition switch lock to control the ignition system of the bus;
   e. means for locking said emergency door against unauthorized entry during non-passenger use of the bus, said emergency-door-locking means being mechanically connected to and serving as a carrier for said ignition key, thereby to require removal of the ignition key from the ignition switch lock to make available said means for locking said emergency door, and subsequently requiring unlocking of said emergency door to permit removal of said emergency door locking means plus said mechanically connected ignition key to make said ignition key then available to operate the ignition switch to start and operate the engine of the bus.

2. A protective and safety door-locking and unlocking system, as in claim 1 in which:
   a. said driver operable means for said front door includes:
      1. a driver's handle conventionally movable at will to said door-opening or to said door-closing position; and
   b. said independent means includes:
      1. a pivoted lever pivotally supported outside the bus on the cowl of the bus; and
      2. a pressure element inside the bus located adjacent, but physically free of, the driver's handle; and
      3. means operable by said outside pivoted lever for moving said inside pressure element to move driver's handle from a dead center position to a free position to be manipulable by said front door to full free door-opening position, to permit entrance into said bus.

3. A protective and safety door-locking and unlocking system for a bus, as in claim 2, in which
   said independent means serves to move said driver's handle out of its dead-center position, so said front door can be manipulated to operate said crank arm to move the driver's handle to full door-open position, thus permitting the manipulated door to be moved to its open position.

4. A protective and safety door-locking and unlocking system for a bus, as in claim 2, wherein said pressure element adjacent the driver's handle constitutes a movable member having a rear rest position and a front active position, and adapted to be movable from its rear rest position to its front active position to impress a side pressure moment force on said driver's handle when said handle is in said dead-center position in door-closed position, said movable member serving thereby to move said driver's handle out of said dead-center position, so manipulation of said front door will be able to move said driver's handle to full door-opening position, and said independent means further includes means for restoring said movable member as a pressure element to its rear rest position.

5. A protective and safety door-locking and unlocking system for a passenger bus, as in claim 4, in which
   a. a support is provided to support said movable member, for impressing said pressure force on said driver's handle, and said support is disposed at a position adjacent, but normally physically disengaged from, said driver's handle, during normal operation of the bus, so there is no impediment in the operating movement of the driver's handle from door-opening position to door-closing position.

6. A protective and safety door locking and unlocking system, for a passenger bus, as in claim 4, in which
   a. said movable member is pivotally supported to turn about an axis laterally transverse to said driver's handle, and is normally physically disengaged from said driver's handle, but is operable by said independent means to turn about said axis and to impress a side thrust against said driver's handle to move said handle out of dead-center position.

7. A protective and safety door-locking and unlocking system for a bus, as in claim 1, in which
   a. latching means are provided on said emergency door, to hold the door latched in closed position but unlocked, and to release the door to permit easy opening of said door when desired;
   b. an operating latch lever for said door-latching means is supported on said door and is manually operable, at will, to move said latching means of said emergency door to door-latching position or to door-releasing position;
   c. a stationary bracket is fixed on said door adjacent to the position of said operating latch lever when said latch lever is in latching position;
   d. and said emergency door locking means is formed to permit its easy application to said latch lever and to said adjacent stationery bracket to lock the latch lever to said stationery bracket against movement to a door-unlatching position, and said separate emergency door locking means is also formed to permit its easy manual removal from said latch lever and from said fixed bracket to permit said released latch lever to be free for movement to normal door-unlatching position, either from inside or from outside said emergency door.

8. A protective and safety door control system, as in claim 1, in which
a. said driver-operable means includes
   1. a platform bracket secured to the structure of the bus;
   2. a pivot pin supported on said platform bracket;
   3. a driver's handle pivotally supported on said pivot pin, and
   4. a connecting rod between said driver's handle and an element for moving the front door;
the operation of the driver's handle to door-closing position being such as to place the driver's handle and connecting rod in a dead-center position relative to said pivot pin, that holds the driver's handle in fixed position against casual movement; and
b. said independent means includes:
   1. a cam plate pivotally supported on said platform bracket and disposed to lie alongside, but physically free of, said driver's handle when said handle is in said dead-center position;
   2. A pivoted lever disposed outside of said bus body; and
   3. a mechanical connection between said pivoted cam plate and said outside pivot lever;
whereby operation of said outside pivoted lever will move said pivoted cam plate to impress a lateral turning force on said driver's handle to move the driver's handle from blocked dead-center position to an unblocked region for free movement, in which unblocked region the driver's handle can be manipulated by movement of the front door from outside the bus.

9. A protective and safety door-locking and unlocking system for a bus, as in claim 1, in which
a. said driver-operable means for said front door includes a driver's handle to move said front door and also includes a rotatable post and a crank arm on said post for moving said front door;
b. and said driver's handle is connected to said crank arm by a tie rod, as part of said driver-operable means to operate said crank arm to rotate said rotatable post, to move said front door to said open position or to said closed position;
c. and said system further comprises a pivotal support for said driver's handle, said pivotal support having an axis positioned to be substantially on a line between the driver's handle in door-closing position and the joint of connection between said crank arm and said tie rod, whereby the driver's handle when in door-closing position is substantially and effectively on dead-center, whereby said driver's handle thereby establishes a firm holding force on said crank arm to hold said front door in closed position.

10. A bus operating system including a door control system for controlling locking front doors and also a rear emergency door of a bus, when not in use, and for opening said front doors and positively controlling the unlocking of the emergency door when the bus is in passenger service, said door control system comprising:
means for freely controlling the front doors by a driver's handle, to open or to closed position, in conventional manner, for passenger service; and for locking said front doors by said driver's handle against unauthorized entry;
latching means for normally latching or releasing, but not locking, the emergency door;
an ignition key for the ignition circuitry for the bus engine;
a carrier and locking means for, and inseparable from, the ignition key, said carrier and locking means serving as a key holder during normal usage, and as a locking means to physically restrain said latching means against movement to release position when said vehicle is not is use, thereby to lock the emergency door closed;
and independent means mounted on the outside of the bus cowl structure, for unlocking the front doors by remotely controlling the driver's handle, to permit entry of the driver, with access to unlock the rear emergency door and release the ignition key to permit starting the bus engine.

* * * * *